United States Patent [19]

Press

[11] Patent Number: 4,811,488

[45] Date of Patent: Mar. 14, 1989

[54] PORTABLE SAW WITH MOVABLE WARNING

[76] Inventor: Reuben F. Press, 211 Sherman Canal, Vanice, Calif. 90291

[21] Appl. No.: 116,496

[22] Filed: Nov. 4, 1987

[51] Int. Cl.[4] .............................................. B23D 45/16

[52] U.S. Cl. .......................................... 30/391; 51/272

[58] Field of Search .................................. 30/373-377, 30/388-391; 83/478, 544; 51/272

[56] References Cited

U.S. PATENT DOCUMENTS 3,662,796 5/1972 Batistelli .......................... 30/376 X

*Primary Examiner*—Douglas D. Watts

*Attorney, Agent, or Firm*—Poms, Smith, Lande & Rose

[57] ABSTRACT

A portable, hand-held circular saw includes a movable lower guard having a lift handle secured to it. A prominent warning sign is secured to the lift handle, to face the operator and come into the field of vision of the operator as the lower blade guard is moved back to expose the circular saw blade.

11 Claims, 2 Drawing Sheets

PORTABLE SAW WITH MOVABLE WARNING

FIELD OF THE INVENTION

This invention relates to circular saws.

BACKGROUND OF THE INVENTION

In the field of hand-held, portable, circular saws, the rotating circulating saw blade normally has two guards, a fixed upper guard, and a rotatable or movable lower guard which swings back when the saw blade is brought into engagement with wood or other material to be cut. In addition, the saw is normally provided with a lower guard lift handle, by which the user may rotate the lower guard out of its normal guarding position, to permit easier direct engagement of the rotating blade with the workpiece.

Hand-held rotary saws are notoriously dangerous, and the operator may easily injure himself or herself, particularly when the movable lower blade guide has been rotated out of its normal guarding position, so that the lower portion of the blade is exposed.

A principal object of the present invention is to prevent, or to greatly reduce the likelihood of accidents occurring with circular saws.

SUMMARY OF THE INVENTION

In accordance with one specific illustrative embodiment of the invention, the lower guard lift handle may be provided with a surface which extends substantially perpendicular to a radial line from the center of the circular saw blade. On this surface is a prominent warning notice, preferably in luminescent ink, stating "CAUTION, BLADE EXPOSED", or some similar "danger" notice.

From a slightly broader aspect of the invention, a circular saw may be provided with any appropriate arrangements for selectively displaying or exposing a bold warning notice to the saw operator as the lower saw blade guard is rotated.

Advantages of the proposed warning include the fact that it is movable, so that it is prominently brought to the attention of the operator, each time the guard is moved backward, either by actual use of the saw, or by manual operation of the lift handle. In addition, when a piece of wood or other debris happens to get lodged in the saw structure so that the guard is held open, the warning sign is automatically displayed, so that any operator who happens to pick up the saw is alerted to the danger.

Other objects, features, and advantages of the invention will become apparent from a consideration of the following detailed description and from the accompanying drawings.

DETAILED DESCRIPTION

Figure 1:
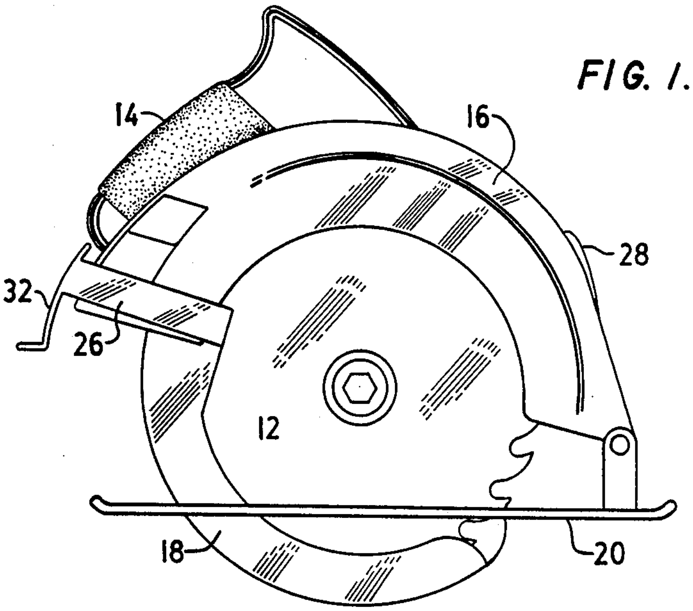
FIG. 1 is a side view of a portable, handheld saw with both the upper and the lower saw blade guards in place, and substantially precluding injury from the saw blade.
Figure 2:
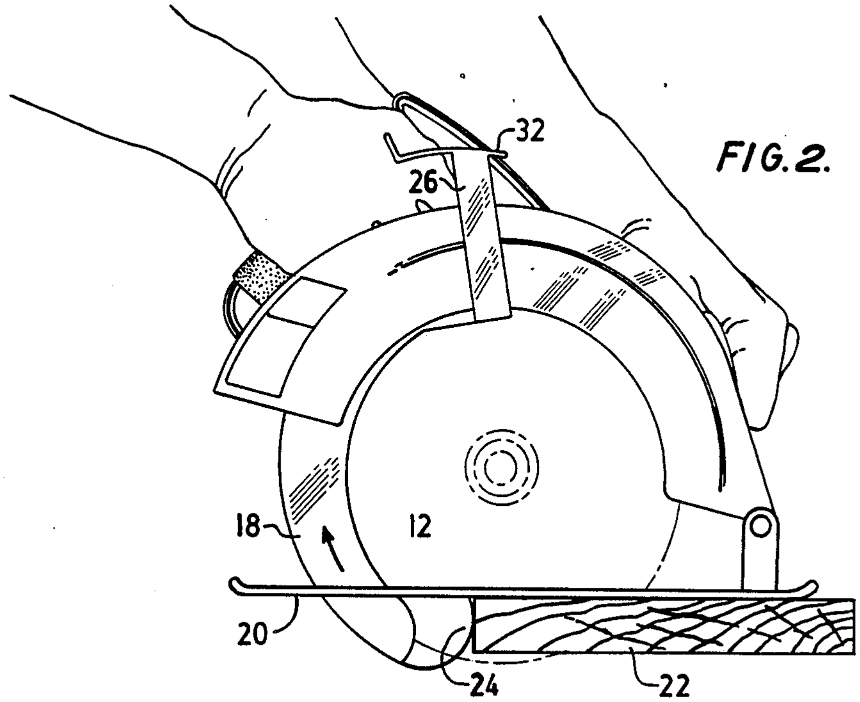
FIG. 2 shows the saw of FIG. 1 in use, with the lower movable saw blade guard being rotated back as a result of engagement with the wood to be cut.

Referring more particularly to the drawings, FIG. 1 shows a hand-held portable circular saw having a saw blade 12, a handle 14, an upper blade guard 16, and a movable lower blade guard 18. As best shown in FIG. 2, the foot or base plate 20 rests on the upper surface of the piece of wood 22 or other material which is being cut, and the lower blade guide 18 is rotated to the rear as the rounded surface 24 forming part of the lower blade guard engages the end of the plank of wood 22 which is being cut. Secured to the lower blade guard 18 is the lower guard lift handle 26, which may be employed to manually raise the lower blade guard 18 and expose the blade 12 when certain operations are undertaken.

Incidentally, it may be noted that there is a front knob 28, which is provided so that the operator may use both his left and right hands in holding and guiding the saw, as indicated in FIG. 2.

Figure 3:
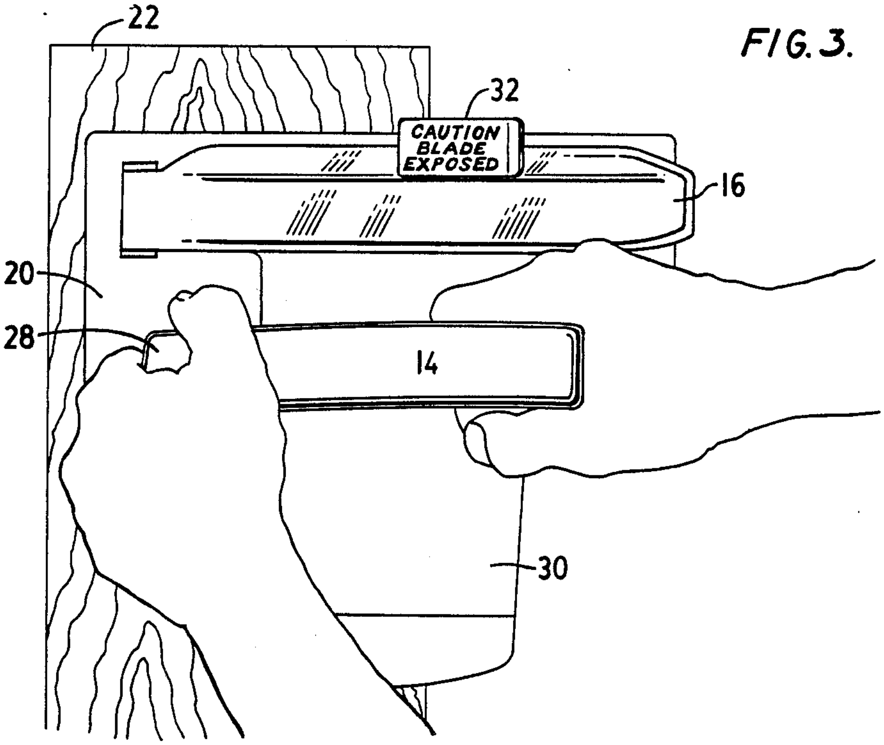
FIG. 3 is a top view of the saw, with the saw engaging work, as shown in FIG. 2, and with the prominent warning clearly displayed to the operator.

FIG. 3 is a top view of the power saw, with the saw in operation and the lower blade guard 18 extending upwardly, as shown in FIG. 2. Also shown in FIG. 3 is the motor 30 which powers the saw.

Secured to the outer end of the lower guard lift handle 26 is the plate 32 which has the prominent notice "CAUTION, BLADE EXPOSED", as best seen in FIG. 3. This warning sign is preferably in bright red or orange fluorescent paint or ink.

It is particularly to be noted that the prominent warning which appears on the plate 32 is in a lower position, substantially out of the view of the operator in FIG. 1, in which the lower blade guard is shown in its forwardmost protected position. However, when the blade becomes exposed as the blade guard is shifted to the rear, the notice moves into the field of vision of the operator, and hopefully has a cautioning effect on the operator, so that the operator will avoid injuring himself or herself.

It is to be understood that the foregoing detailed description relates to one specific illustrative embodiment of the invention. Other arrangements may be employed to accomplish the same purpose. Thus, by way of example but not of limitation, the notice 32 may be on a separate element secured to the lower guard lift handle, rather than being integral with it. Alternatively, the warning may be secured to the fixed upper blade guard, and may be pivoted into view or out of view of the user, by the movement of the lower blade guard. As a further alternative, a movable plate may be provided to cover a fixed prominent warning on the upper blade guard, and that plate may be shifted out of position by a mechanical linkage with the lower blade guard, so that the normally concealed warning is made visible when the lower blade guard is shifted in position to expose the saw blade. Also, instead of the legend "CAUTION, BLADE EXPOSED", the warning sign could include the single word "DANGER", or "DANGER, BLADE EXPOSED", or any other suitable warning language. Accordingly, it is to be understood that the present invention is not limited to the precise construction as shown in the drawings and described hereinabove.

What is claimed is:

1. A safe hand tool comprising:

a portable, hand-held circular saw including a drive motor and a circular blade;

a fixed upper guard means for protecting the user against engagement with the circular blade;

a movable lower guard means for normally protecting the user against engagement with the circular blade when the saw is not being actively used in cutting operations, said lower guard means being pivotally mounted to swing back and up toward the used as the saw engages material to be cut; and prominent written warning means in a brillant or fluorescent color secured to said movable lower guard means for moving into the normal view area of the saw operator as the lower guard means swings back and up to expose the lower portion of the circular saw blade;

whereby a moving prominent warning sign alerts the saw operator to the danger of the exposed blade.

2. A safe hand tool as defined in claim 1 wherein a lower guard lift handle is secured to the movable lower guard, and wherein said prominent warning means is secured to the lower guard lift handle.

3. A safe hand tool as defined in claim 1 wherein said prominent warning means is located on a substantially flat surface which extends substantially perpendicular to a line extending from the center of the circular saw blade to the warning means.

4. A safe hand tool as defined in claim 2 wherein a member having a substantially flat surface extending substantially perpendicular to a radial line from the center of the saw blade, is secured to the outer end of said lower guard lift handle and the prominent warning is located on said surface.

5. A safe hand tool as defined in claim 1 wherein said warning sign includes the message "BLADE EXPOSED".

6. A safe hand tool comprising:

a portable, hand-held circular saw including a drive motor and a circular blade;

a fixed upper guard means for protecting the user against engagement with the circular blade;

a movable lower guard means for normally protecting the user against engagement with the circular blade when the saw is not being actively used in cutting operations, said lower guard means being pivotally mounted to swing back and up toward the user as the saw engages material to be cut;

a prominent written warning sign in a brilliant or fluorescent color; and means for locating said warning sign out of the view of the saw operator when the lower guard means is shielding the saw blade, and for exposing said warning sign within the normal view area of the saw operator when the lower guard means is shifted in position to expose the lower portion of the circular saw blade;

whereby the exposure of said warning sign to the operator alerts the saw operator to the danger of the exposed blade.

7. A safe hand tool as defined in claim 1 wherein a lower guard lift handle is secured to the movable lower guard, and wherein means are provided for coupling said prominent warning sign to the lower guard lift handle.

8. A safe hand tool as defined in claim 1 wherein said prominent warning means is located on a substantially flat surface which extends substantially perpendicular to a line extending from the center of the circular saw blade to the warning sign.

9. A safe hand tool as defined in claim 1 wherein said warning means is red in color.

10. A safe hand tool as defined in claim 1 wherein said warning means is orange in color.

11. A safe hand tool as defined in claim 2 wherein said safe hand tool includes said lift handle, a warning support member secured to the outer end of said lift handle and extending generally perpendicular thereto to provide said surface for said written warning, and an additional outwardly extending member mounted on said warning support member and extending outwardly therefrom and from the axis of said circular blade.

* * * * *